United States Patent
Machida

(10) Patent No.: US 10,193,197 B2
(45) Date of Patent: Jan. 29, 2019

(54) BATTERY DEVICE

(71) Applicant: TOYOTA JIDOSHA KABUSHIKI KAISHA, Toyota-shi, Aichi-ken (JP)

(72) Inventor: Kiyohito Machida, Togo-cho (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 49 days.

(21) Appl. No.: 15/285,874

(22) Filed: Oct. 5, 2016

(65) Prior Publication Data

US 2017/0125861 A1    May 4, 2017

(30) Foreign Application Priority Data

Nov. 4, 2015 (JP) .................... 2015-216367

(51) Int. Cl.

| H01M 10/633 | (2014.01) |
|---|---|
| H01M 10/613 | (2014.01) |
| H01M 10/625 | (2014.01) |
| H01M 10/6563 | (2014.01) |
| B60K 1/04 | (2006.01) |
| H01M 10/48 | (2006.01) |
| B60K 1/00 | (2006.01) |

(52) U.S. Cl.
CPC ............ *H01M 10/633* (2015.04); *B60K 1/04* (2013.01); *H01M 10/486* (2013.01); *H01M 10/613* (2015.04); *H01M 10/625* (2015.04); *H01M 10/6563* (2015.04); *B60K 2001/005* (2013.01); *H01M 2220/20* (2013.01)

(58) Field of Classification Search
CPC .......................... H01M 10/633; H01M 10/613
USPC ........................................................ 429/62
See application file for complete search history.

(56) References Cited

U.S. PATENT DOCUMENTS

| 6,377,880 | B1 | 4/2002 | Kato et al. | |
|---|---|---|---|---|
| 8,142,919 | B2* | 3/2012 | Kawai | ................ H01M 10/625 429/163 |
| 2005/0275383 | A1 | 12/2005 | Ishishita | |
| 2006/0259817 | A1* | 11/2006 | Kawai | ................ H01M 10/625 714/14 |
| 2009/0176150 | A1 | 7/2009 | Yanaka | |
| 2011/0089953 | A1 | 4/2011 | Chandler et al. | |

(Continued)

FOREIGN PATENT DOCUMENTS

| DE | 10045426 A1 | 5/2001 |
|---|---|---|
| DE | 102010047960 A1 | 6/2011 |

(Continued)

*Primary Examiner* — Abdullah Riyami
*Assistant Examiner* — Nader Alhawamdeh
(74) *Attorney, Agent, or Firm* — Sughrue Mion, PLLC

(57) ABSTRACT

To provide a battery device including a battery; a first cooling system having a first cooling fan and a first temperature sensor; a second cooling system having a second cooling fan and a second temperature sensor; and a controller, wherein the controller carries out abnormality determination with respect to a temperature sensor when a difference between the first cooling air temperature and the second cooling air temperature, detected by the first temperature sensor and the second temperature sensor, respectively, after elapse of a predetermined set period after a start switch of the vehicle is turned off while the first cooling fan and the second cooling fan remain stopped, is equal to or greater than a predetermined amount.

5 Claims, 5 Drawing Sheets

(56) References Cited

U.S. PATENT DOCUMENTS

| | | | |
|---|---|---|---|
| 2014/0224468 A1* | 8/2014 | Saito | F01P 7/08 |
| | | | 165/200 |
| 2015/0255838 A1 | 9/2015 | Inoue et al. | |
| 2015/0291055 A1* | 10/2015 | He | B60L 11/1874 |
| | | | 429/50 |
| 2015/0331059 A1 | 11/2015 | Okada et al. | |
| 2017/0125861 A1* | 5/2017 | Machida | H01M 10/613 |

FOREIGN PATENT DOCUMENTS

| | | |
|---|---|---|
| JP | 2003-286888 A | 10/2003 |
| JP | 2006-4655 A | 1/2006 |
| JP | 2006-269220 A | 10/2006 |
| JP | 2008-293853 A | 12/2008 |
| JP | 2009-154698 A | 7/2009 |
| JP | 5355966 B2 | 11/2013 |
| WO | 2014/118911 A1 | 8/2014 |

* cited by examiner

BATTERY DEVICE

CROSS REFERENCE TO RELATED APPLICATION

The entire disclosure of Japanese Patent Application No. 2015-216367 filed on Nov. 4, 2015, including specification, claims, drawings and abstract, is incorporated herein by reference in its entirety.

TECHNICAL FIELD

The present disclosure relates to a battery device for a vehicle.

BACKGROUND

Recently, many electric vehicles such as an electric vehicle that uses a motor as a driving source, a hybrid vehicle that uses a motor and an engine as a driving source, and the like, have been used. Such an electric vehicle includes a chargeable/dischargeable battery that supplies electric power to a motor and is charged by electric power generated by the motor when the motor is operating as a power generator. As a battery, a nickel-metal hydride battery, a lithium ion battery, or the like is used. As the temperature of such a battery increases when the battery is charged or discharged, a cooling device for cooling the battery is mounted on an electric vehicle.

A battery cooling device employs a method in which a temperature sensor is arranged at the inlet of a cooling channel of a battery, for adjusting the amount of air blown by a cooling fan, based on the temperature of a cooling air, detected by the temperature sensor, and the temperature of the battery detected by a battery temperature sensor, to cool the battery so as to be kept at a good operating temperature for the battery itself (for example, JP5355966). Note here that a battery device having two independent cooling systems for cooling a battery has been suggested. Further note that a cooling system includes a cooling fan and a cooling air duct (for example, JP2008-293853A).

In the case in which a plurality of independent cooling systems are included, as described in JP 2008-293853A, for example, it is often the case that the rotation speed of each cooling fan is controlled based on the temperature of cooling air detected by a temperature sensor arranged at the inlet of the relevant cooling channel of a battery and the temperature of a part of the battery cooled by the relevant cooling system. In this case, when such an abnormality that the resistance value of a thermistor is changed and accurate detection of the temperature is not possible should occur with the temperature characteristic of the temperature sensor, it is not possible to appropriately control the cooling fan of the cooling system with the temperature sensor subjected to abnormality. This makes it difficult to achieve appropriate control over the temperature of a part of the battery cooled by that cooling system.

In view of the above, abnormality determination as to temperature characteristic of a temperature sensor is important. However, in the case where a plurality of cooling systems are included, as the rotation speeds of the respective cooling fans are independently controlled, each based on the temperature detected by a temperature sensor provided to a cooling channel and the temperature of a part of a battery cooled by the cooling channel, a case may result in which the amounts of air blown by the respective cooling fans vary between the respective cooling systems, so that a difference is caused between the temperatures detected by the temperature sensors provided in the respective cooling channels. Moreover, as the respective positional relationships between a battery and respective temperature sensors are not constant, a case may result in which the temperature of the cooling air differs from between the inlets of the respective cooling channels due to influence of the temperature of the battery. This makes it difficult to make abnormality determination as to temperature characteristic of a temperature sensor, based on the difference between the temperatures detected by the temperature sensors provided to the respective cooling systems. In order to address the above, there is available a method in which two temperature sensors are arranged for each cooling system, for performing abnormality determination as to temperature characteristic of the temperature sensor, based on the difference between the temperatures detected by the two respective temperature sensors. This, however, causes a problem of an increased number of temperature sensors, and a resultantly complicated structure.

In view of the above, the present disclosure aims to achieve abnormality determination as to temperature characteristic of a temperature sensor, using a simple structure, in a battery device including a plurality of cooling systems.

SUMMARY

A battery device according to the present disclosure comprises a battery for supplying electric power to a motor for driving a vehicle; a first cooling system having a first cooling fan for supplying cooling air to a first cooling channel of the battery and a first temperature sensor for detecting first cooling air temperature at an inlet of the first cooling channel; a second cooling system having a second cooling fan for supplying cooling air to a second cooling channel of the battery and a second temperature sensor for detecting second cooling air temperature at an inlet of the second cooling channel; and a controller for receiving a detection value from each of the first and second temperature sensors, wherein the controller performs abnormality determination of determining that temperature characteristic of the first or second temperature sensor is abnormal when a difference between the first cooling air temperature and the second cooling air temperature detected by the first temperature sensor and the second temperature sensor, respectively, after elapse of a predetermined set period after a start switch of the vehicle is turned off while the first cooling fan and the second cooling fan remain stopped, is equal to or greater than a predetermined amount.

As described above, as it is possible to detect abnormality in temperature characteristic of the first or second temperature sensor, based on whether or not the difference between the first and second cooling air temperatures that are detected by the first and second respective temperature sensors after the temperature of the ambient air around the first and second respective temperature sensors is stabilized after elapse of a predetermine set period after a start switch of the vehicle is turned off with the first cooling fan and the second cooling fan stopped, is equal to or greater than a predetermined amount, it is possible to perform abnormality determination as to temperature characteristic of a temperature sensor in a battery device having a plurality of cooling systems, using a simple structure without a plurality of temperature sensors provided in the respective cooling systems.

In the battery device according to the present disclosure, it is to confirm abnormality in temperature characteristic of the first or second temperature sensor when it is determined that the first and second cooling fans are normal after it is determined that the temperature characteristic of the first or second temperature sensor is abnormal.

With the above, it is possible to reduce possibility of erroneous detection of abnormality in temperature characteristic of the first or second temperature sensor 28, 39.

The present disclosure can produce such an effect that abnormality determination as to temperature characteristic of a temperature sensor can be made, using a simple structure, in a battery device including a plurality of cooling systems.

BRIEF DESCRIPTION OF THE DRAWINGS

Embodiment(s) of the present disclosure will be described based on the following figures, wherein.

DETAILED DESCRIPTION

Figure 1:
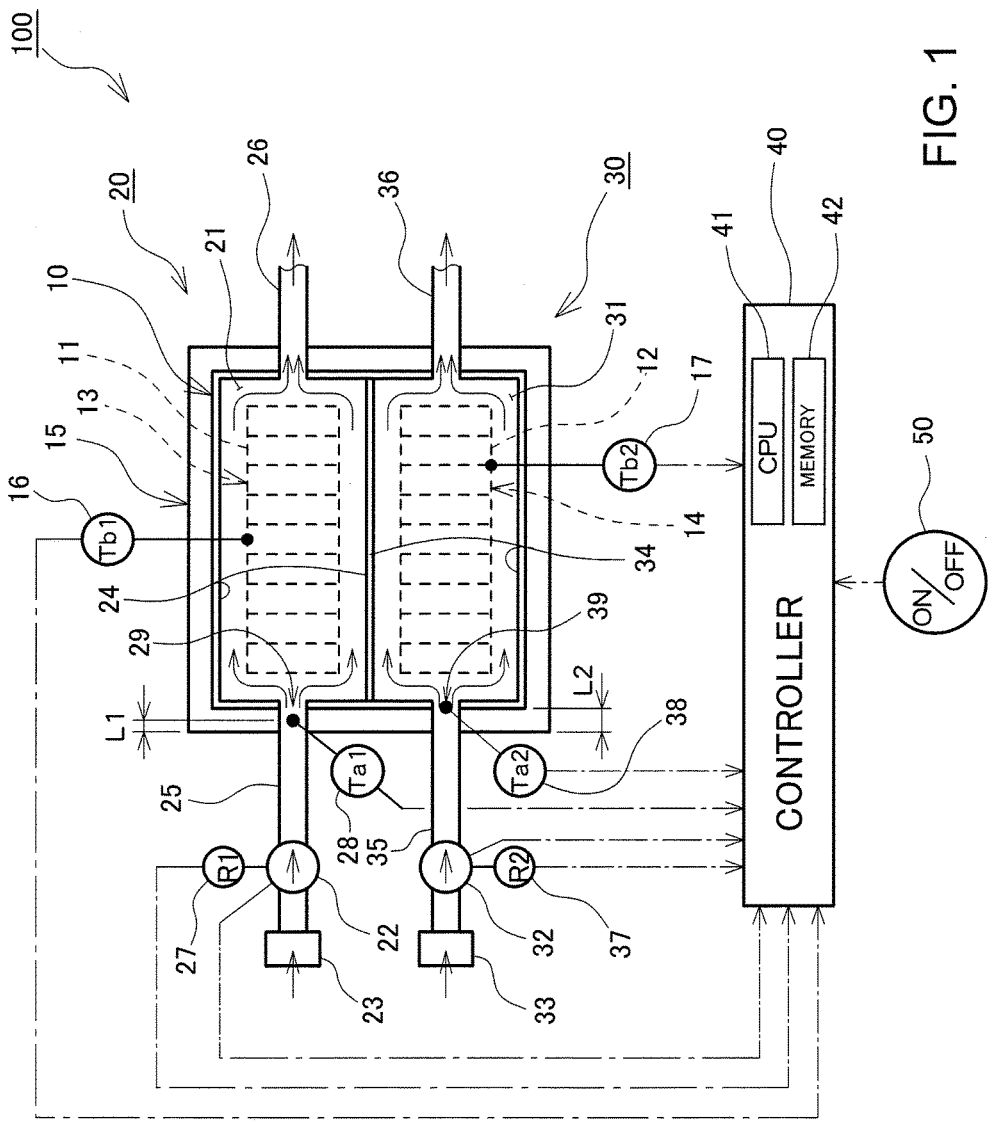
FIG. 1 is a system diagram showing a structure of a battery device according to an embodiment of the present disclosure.

In the following, an embodiment of the present disclosure will be described with reference to the accompanying drawings. As shown in FIG. 1, a battery device 100 in this embodiment includes a battery 10 for supplying electric power to a motor for driving a vehicle, first and second cooling systems 20, 30, and a controller 40. As shown in FIG. 1, the battery 10 includes a first battery set 13 including a plurality of battery cells 11 stacked one on the other and a second battery set 14 including a plurality of battery cells 12 stacked one on the other, and is stored in a metallic casing 15. The first cooling system 20 includes a first air inlet 23, a first cooling fan 22, a first connecting duct 25, a first cooling channel 21, and a first discharge duct 26, while the second cooling system 30 includes a second air inlet 33, a second cooling fan 32, a second connecting duct 35, a second cooling channel 31, and a second discharge duct 36. The first and second air inlets 23, 33 are connected to the air inlets of the first and second respective cooling fans 22, 32, to suck the air inside a vehicle. The first and second connecting ducts 25, 35 connect, via the casing 15, the air outlets of the first and second respective cooling fans 22, 32 and the inlets 29, 39 of the first and second respective cooling channels 21, 31. The first and second cooling fans 22, 32 supply the air inside the vehicle, that has been sucked through the first and second respective air inlets 23, 33, as cooling air to the first and second respective cooling channels 21, 31 through the first and second respective connecting ducts 25, 35. The first and second cooling channels 21, 31 are defined by respective partitions 24, 34, and cause the cooling air to flow around the first and second respective battery sets 13, 14. The first and second discharge ducts 26, 36 discharge the air having cooled the first and second respective battery sets 13, 14 through the first and second respective cooling channels 21, 31 to the outside of the casing 15.

In the vicinity of the inlet 29 of the first cooling system 20, a first temperature sensor 28 for detecting a first cooling air temperature Ta1 at the inlet 29 of the first cooling channel 21 is arranged, while in the vicinity of the inlet 39 of the second cooling system 30, a second temperature sensor 38 for detecting a second cooling air temperature Ta2 at the inlet 39 of the second cooling channel 31 is arranged. As shown in FIG. 1, the first temperature sensor 28 is arranged at a position displaced inward from the side panel of the casing 15 by a distance L1, while the second temperature sensor 38 is arranged at a position displaced inward from the side panel of the casing 15 by a distance L2. The distances L1, L2 are different from each other, and accordingly, the distances of the first and second respective temperature sensors 28, 38 from the side panel of the casing 15 are different from each other. In the first and second respective battery sets 13, 14 of the battery 10, first and second battery temperature sensors 16, 17 for detecting the first and second battery temperatures Tb1, Tb2 of the first and second respective battery sets 13, 14 are provided. On the first and second respective cooling fans 22, 32, first and second rotation speed sensors 27, 37 for detecting the rotation speeds R1, R2 of the first and second respective cooling fans 22, 32 are provided. In addition, a start switch 50 for starting and stopping a vehicle is mounted on the front panel of the vehicle. When the start switch 50 is turned on, electric power of the battery 10 is supplied to a vehicle driving motor. Meanwhile, when the start switch 50 is turned off, connection between the battery 10 and the motor is disconnected, and the first and second cooling fans 22, 32 stop operating.

The values detected by the first and second temperature sensors 28, 38, the first and second battery temperature sensors 16, 17, and the first and second rotation speed sensors 27, 37 and an on/off signal of the start switch 50, are inputted to the controller 40. The first and second cooling fans 22, 32 are driven in response to respective instructions from the controller 40. The controller 40 incorporates a CPU 41 for operation processing and a memory 42 for storing a control program, control data, or the like. The controller 40 adjusts the rotation speed R1 of the first cooling fan 22, based on the first battery temperature Tb1 of the first battery set 13 detected by the first battery temperature sensor 16 and the first cooling air temperature Ta1 detected by the first temperature sensor 28. Similarly, the controller 40 adjusts the rotation speed R2 of the second cooling fan 32, based on the second battery temperature Tb2 of the second battery set 14 detected by the second battery temperature sensor 17 and the second cooling air temperature Ta2 detected by the second temperature sensor 38.

Below, with reference to FIGS. 2, 4A, 4B, an operation for detecting abnormality in temperature characteristic of the first and second temperature sensors 28, 38 of the battery device 100 having the above described structure will be described. Note that abnormality in temperature characteristic of the first and second temperature sensors 28, 38 refers to such abnormality that the resistance values of the thermistors of the first and second respective temperature sensors 28, 38 are changed and accurate temperature detection is not possible.

Figure 4A:
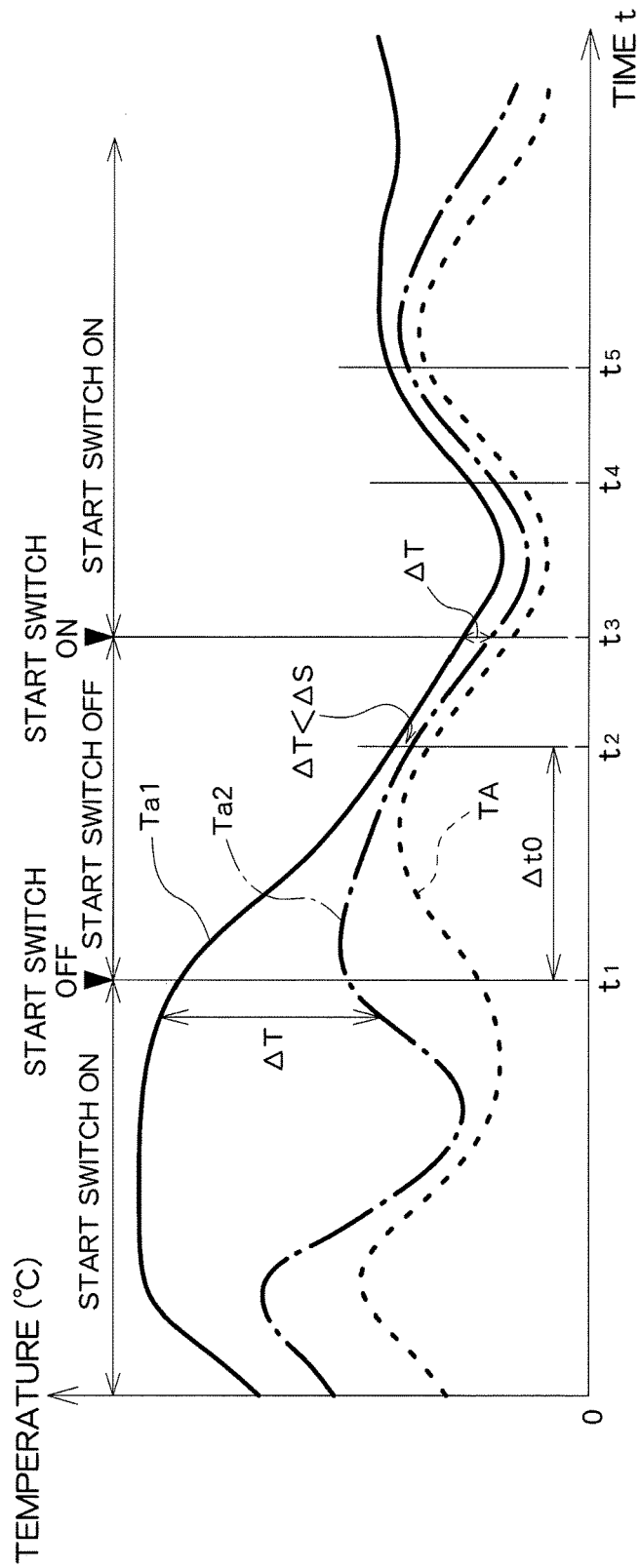
FIG. 4A is a graph showing a change as time passes in the temperature detected by a temperature sensor of a battery device according to an embodiment of the present disclosure and the indoor temperature of a vehicle.

In FIG. 4A, the solid line indicates a change as time passes in the first cooling air temperature Ta1 detected by the first temperature sensor 28, the alternate long and short dash line indicates a change as time passes in the second cooling air temperature Ta2 detected by the second temperature sensor 38, and the broken line indicates a change in the indoor temperature TA. In FIG. 4B, the solid line indicates a change as time passes in the rotation speed R1 of the first cooling fan 22, and the alternate long and short dash line indicates a change as time passes in the rotation speed R2 of the second cooling fan 32.

Figure 4B:
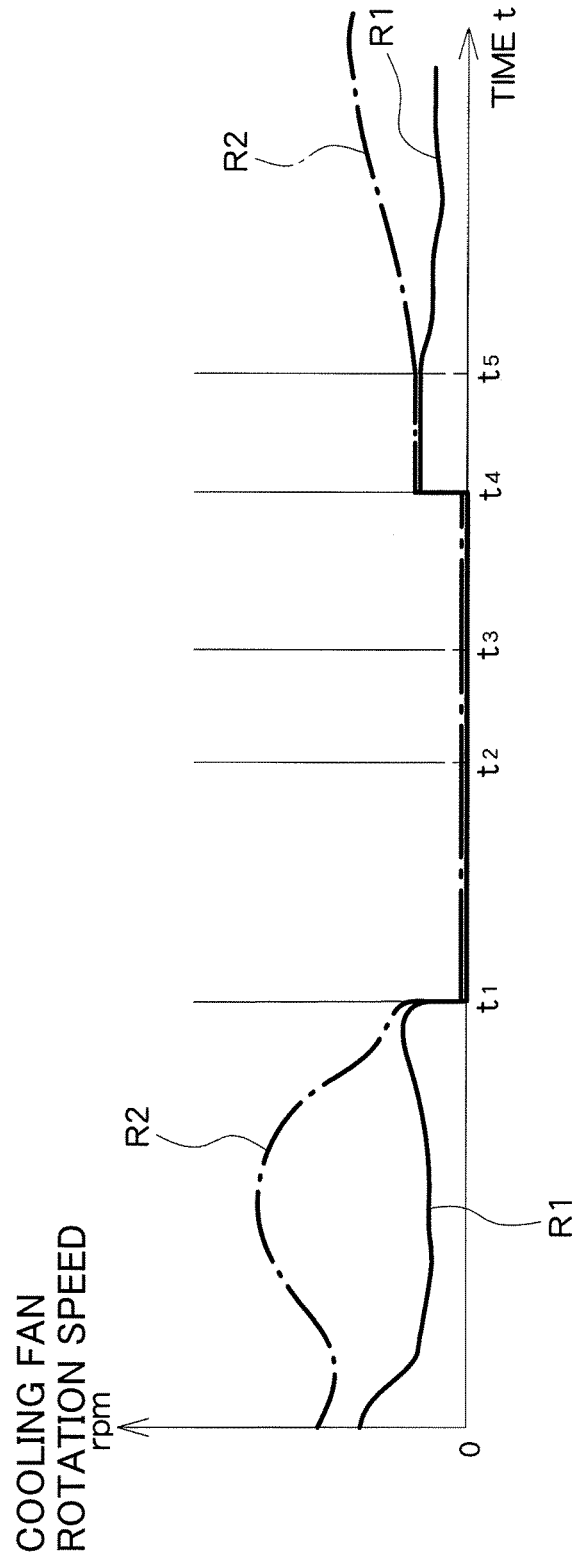
FIG. 4B is a graph showing a change as time passes in the rotation speed of a cooling fan of a battery device according to an embodiment of the present disclosure.

During the period from time 0 to time t1 in FIGS. 4A, 4B, the vehicle is running with the start switch 50 shown in FIG. 1 in an on state. While the vehicle is running, as the temperature of the battery 10 increases, the controller 40 adjusts the rotation speeds R1, R2 of the first and second respective cooling fans 22, 32 such that the first battery temperature Tb1 of the first battery set 13 of the battery 10 and the second battery temperature Tb2 of the second battery set 14 of the battery 10 are kept within respective predetermined temperature ranges.

When the first battery temperature Tb1 of the first battery set 13 of the battery 10 is low and the second battery temperature Tb2 of the second battery set 14 is high, the controller 40 reduces the rotation speed R1 of the first cooling fan 22, and increases the rotation speed R2 of the second cooling fan 32. As a result, the amount of cooling air flowing from the first air inlet 23 through the first connecting duct 25 to the first cooling channel 21 becomes smaller, while that which flows from the second air inlet 33 through the second connecting duct 35 to the second cooling channel 31 becomes larger. In addition, as the temperature of the battery 10 increases while the vehicle is running, the temperature of the metallic casing 15 that stores the battery 10 accordingly increases. As a result, the temperature of the ambient air around the first and second respective temperature sensors 28, 38 also increases due to heat conduction from the side panel of the casing 15. As the rotation speed R1 of the first cooling fan 22 is slow and the amount of cooling air flowing from the first connecting duct 25 to the first cooling channel 21 is small, as described above, heat influence from the casing 15 is significant in the vicinity of the inlet 29 of the first cooling channel 21 where the first temperature sensor 28 is arranged. As a result, the first cooling air temperature Ta1 becomes significantly higher than the vehicle indoor temperature TA at the first air inlet 23. Meanwhile, as the rotation speed R2 of the second cooling fan 32 is fast and the amount of cooling air flowing from the second air inlet 33 through the second connecting duct 35 to the second cooling channel 31 is large, the second temperature sensor 38 is less affected by the heat from the casing 15 even when the temperature of the air in the vicinity of the inlet 39 of the second cooling channel 31 increases due to heat conduction from the side panel of the casing 15, and the temperature detected by the second temperature sensor 38 shifts at a level slightly higher than the vehicle indoor temperature TA at the second air inlet 33.

In the middle of the period of time from time 0 to time t1 shown in FIG. 4A, the second battery temperature Tb2 of the second battery set 14 is decreasing thanks to the cooling air supplied from the second cooling fan 32, and the controller 40 reduces the rotation speed R2 of the second cooling fan 32 to thereby reduce the amount of cooling air flowing from the second connecting duct 35 to the second cooling channel 31. As a result, similar to the above described first temperature sensor 28, the second temperature sensor 38 comes to be affected by the heat from the casing 15, and accordingly the second cooling air temperature Ta2 detected by the second temperature sensor 38 gradually increases over the vehicle indoor temperature TA.

At a time slightly before time t1 in FIG. 4A, the rotation speeds R1, R2 of the first and second cooling fans 22, 32 are very close to each other. However, the first temperature sensor 28 arranged at a position away from the side panel of the casing 15 by the distance L1 is more largely affected by the heat from the casing 15 than the second temperature sensor 38 arranged at a position away from the side panel of the casing 15 by the distance L2 that is longer than the distance L1. Therefore, when the rotation speeds R1, R2 of the first and second cooling fans 22, 32 are very close to each other or the same, the first cooling air temperature Ta1 becomes higher than the second cooling air temperature Ta2, which results in a difference $\Delta T$ between the first and second cooling air temperatures Ta1, Ta2.

As described above, while the vehicle is running and the first and second cooling fans 22, 32 are operating, the temperature of the ambient air around the first and second temperature sensors 28, 38 is unstable, and the difference $\Delta T$ is caused all the time between the first cooling air temperature Ta1 detected by the first temperature sensor 28 and the second cooling air temperature Ta2 detected by the second temperature sensor 38.

When a driver stops the vehicle and turns off the start switch 50 at time t1 shown in FIGS. 4A, 4B, the first and second cooling fans 22, 32 stop operating, and the rotation speeds R1, R2 thereof become zero, as shown in FIG. 4B. Moreover, with the vehicle stopped, connection between the battery 10 and the motor is disconnected, which leaves the battery 10 being neither charged nor discharged. Therefore, at time t1 and thereafter shown in FIG. 4A, the temperature of the battery 10 gradually decreases, and the first and second cooling air temperatures Ta1, Ta2 detected by the first and second temperature sensors 28, 38 also gradually decrease.

When the start switch 50 is in an off state, operation of the first and second cooling fans 22, 32 is stopped, and accordingly no cooling air flows into the first and second cooling channels 21, 31 inside the battery 10. Therefore, the temperature of the ambient air around the first and second temperature sensors 28, 38 becomes stabilized. As a result, the difference $\Delta T$ between the first and second cooling air temperatures Ta1, Ta2 becomes smaller. Moreover, with the vehicle stopped, the temperature of the battery 10 decreases, and the temperature of the casing 15 accordingly decreases. This reduces the change in the temperature of the ambient air around the first and second respective temperature sensors 28, 38 due to influence of the heat from the casing 15. This also contributes to reduction of the difference $\Delta T$ between the first and second cooling air temperatures Ta1, Ta2.

At time t2, or a time after elapse of a set period $\Delta t0$ after time t1 at which the start switch 50 is turned off with the vehicle stopped and the first and second cooling fans 22, 32 not operating, the temperature of the ambient air around the first and second temperature sensors 28, 38 is stabilized. Therefore, if the temperature characteristic of the first or second temperature sensor 28, 38 is not abnormal, the difference $\Delta T$ between the first and second cooling air temperatures Ta1, Ta2 becomes less than a predetermined threshold $\Delta S$.

Figure 2:
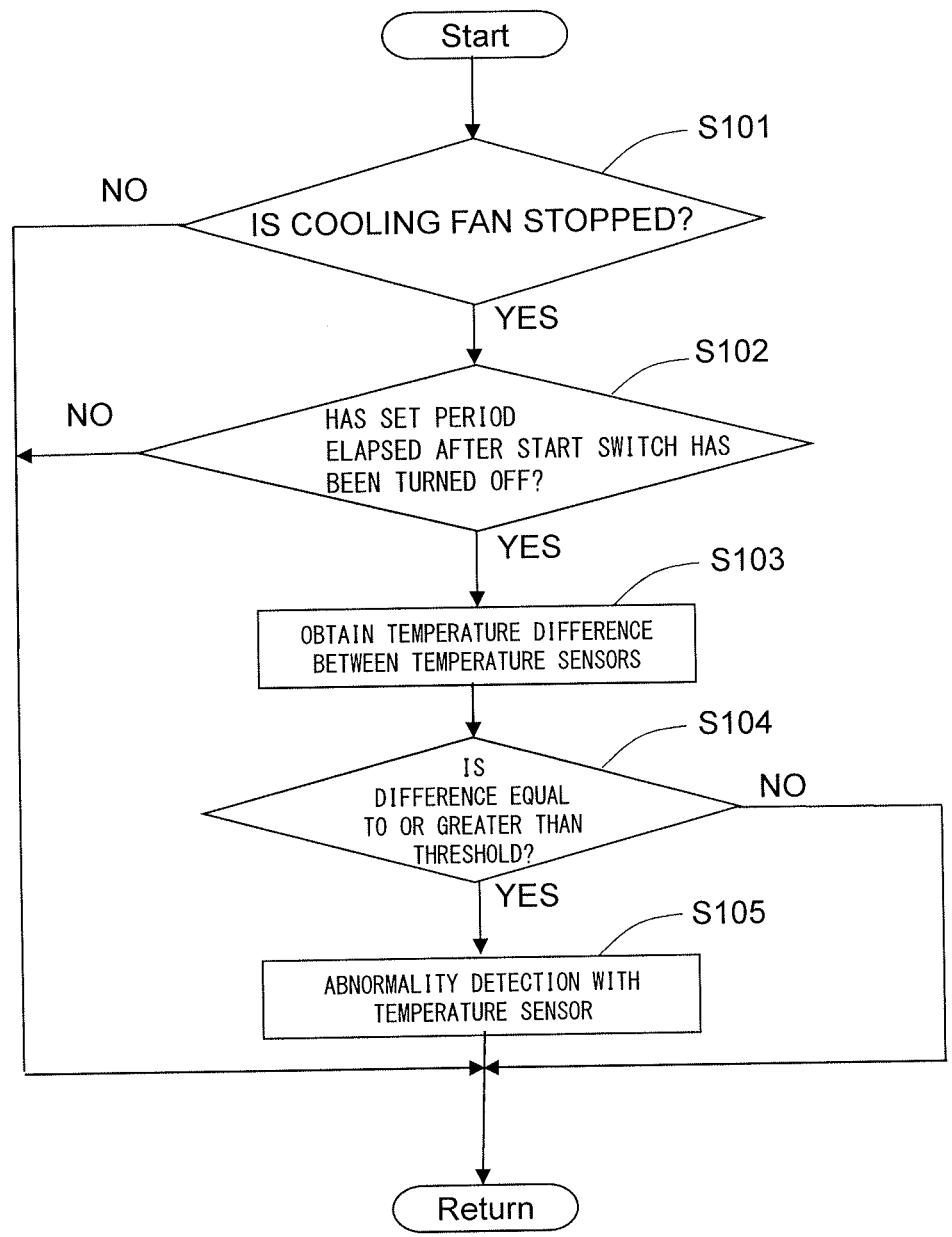
FIG. 2 is a flowchart showing an operation of a battery device according to an embodiment of the present disclosure.

In view of the above, when a vehicle stops and the start switch 50 is turned off, the controller 40 determines whether or not the first and second cooling fans 22, 32 are stopped, as indicated by S101 in FIG. 2. Specifically, the controller 40 detects the rotation speeds R1, R2 of the first and second cooling fans 22, 32, using the first and second rotation speed sensors 27, 37, to determine whether the rotation speeds R1, R2 are zero or equal to or less than a predetermined threshold ΔSR close to zero, and also whether instruction values with respect to the rotation speeds R1, R2 of the first and second cooling fans 22, 32 are zero, to thereby determine that the first and second cooling fans 22, 32 are stopped. After determination that the first and second cooling fans 22, 32 are stopped, the controller 40 proceeds to step S102 in FIG. 2 to determine whether or not a predetermined set period Δt0 has elapsed after the start switch 50 has been turned off. Various methods are available for this determination. For example, the determination may be made by activating a timer at time t1 at which the start switch 50 is turned off to count time, storing the time counted in the memory 42, and reading time data to determine whether or not the period of time indicated by the time data exceeds a predetermined set period Δt0. Alternatively, the determination may be made by storing time t1 at which the start switch 50 is turned off in the memory 42, and determining whether or not the difference from the current time exceeds the predetermined set period Δt0. Note here that the set period Δt0 may be set in advance to a constant period or may be set, based on a map or the like, depending on the temperature, SOC, or the like, of the battery 10 when the start switch 50 is turned off.

When it is determined at step S102 in FIG. 2 that the predetermined set period Δt0 has elapsed, the controller 40 determines that a premise condition for determining abnormality in temperature characteristic of the first or second temperature sensor 28, 38 is satisfied. Then, the controller 40 proceeds to step S103 in FIG. 2 to obtain the difference ΔT between the first cooling air temperature Ta1 detected by the first temperature sensor 28 and the second cooling air temperature Ta2 detected by the second temperature sensor 38. Thereafter, the controller 40 proceeds to step S104 to determine whether or not the difference ΔT obtained is equal to or greater than a predetermined threshold ΔS. When it is determined at step S104 that the difference ΔT is equal to or greater than the predetermined threshold ΔS, that is, when it is determined YES at step S104, the controller 40 proceeds to step S105 in FIG. 2 to detect abnormality in temperature characteristic of the first or second temperature sensor 28, 38 and outputs an abnormality signal to a diagnosis unit or the like before ending the temperature sensor abnormality determination routine.

Meanwhile, when the difference ΔT obtained at step S103 in FIG. 2 is less than the predetermined threshold ΔS, the controller 40 determines NO at step S104, and ends the temperature sensor abnormality determination routine, skipping step S105 in FIG. 2, that is, without detecting abnormality in temperature characteristic of the first and second temperature sensors 28, 38.

Meanwhile, when it is not determined at step S101 in FIG. 2 that the first and second cooling fans 22, 32 are stopped or when it is determined NO at step S102 in FIG. 2 as the predetermined set period Δt0 has not yet elapsed after the start switch 50 has been turned off, the controller 40 determines that a premise condition for making temperature sensor abnormality determination is not satisfied, and ends the temperature sensor abnormality determination routine without making temperature sensor abnormality determination.

The operation from step S103 to S105 in FIG. 2 may be executed at time t2 shown in FIG. 4A, or a time after elapse of the set period Δt0, as indicated by step S102 in FIG. 2, as long as the controller 40 is operating even when the start switch 50 is in an off state. Alternatively, in the case where the start switch 50 is in an off state and the controller 40 operates intermittently, such as once every hour, the operation from step S103 to S105 in FIG. 2 may be executed at a time when the controller 40 operates between time t2 and time t3 shown in FIG. 4A. Still alternatively, as shown in FIG. 4A, the operation from step S103 to S105 in FIG. 2 may be executed after time t3, or a time at which the start switch 50 in an off state is turned on after elapse of the set period Δt0, before time t4, at which the first and second cooling fans 22, 32 are activated.

According to the above described battery device 100, abnormality in temperature characteristic of the first or second temperature sensors 28, 38 can be detected based on whether or not the difference ΔT between the first and second cooling air temperatures Ta, Tat that are detected by the first and second temperature sensors 28, 38 when the temperature of the ambient air around the first and second temperature sensor 28, 28 is stabilized after elapse of a predetermined set period Δt0 after the start switch 50 is turned off with the vehicle stopped and the first and second cooling fans 22, 32 not operating is equal to or greater than a predetermined threshold ΔS. This makes it possible, in a battery device 10 having a plurality of cooling systems, to determine abnormality in temperature characteristic of a temperature sensor, using a simple structure without a plurality of temperature sensors provided in the respective cooling systems.

In the following, another operation of the battery device 100 in this embodiment will be described with reference to FIGS. 3, 4A, and 4B. This operation includes provisional abnormality determination as to temperature characteristic of the first or second temperature sensor 28, 38, made after elapse of a predetermined set period ΔT0 after the start switch 50 is turned off with the first and second cooling fans 22, 32 stopped, and subsequent final abnormality determination as to temperature characteristic of the first or second temperature sensor 28, 38, made after determining, after the first and second cooling fans 22, 32 are activated, that the operations of the first and second cooling fans 22, 32 are normal and that connections of the first and second temperature sensors 28, 38 are normal, to thereby confirm abnormality in temperature characteristic of the first or second temperature sensor 28, 38. Note that as the operation from steps S101 to S104 in FIG. 3 is identical to that which has been described with reference to FIG. 2, identical step numbers are given and a description thereof is omitted.

Figure 3:
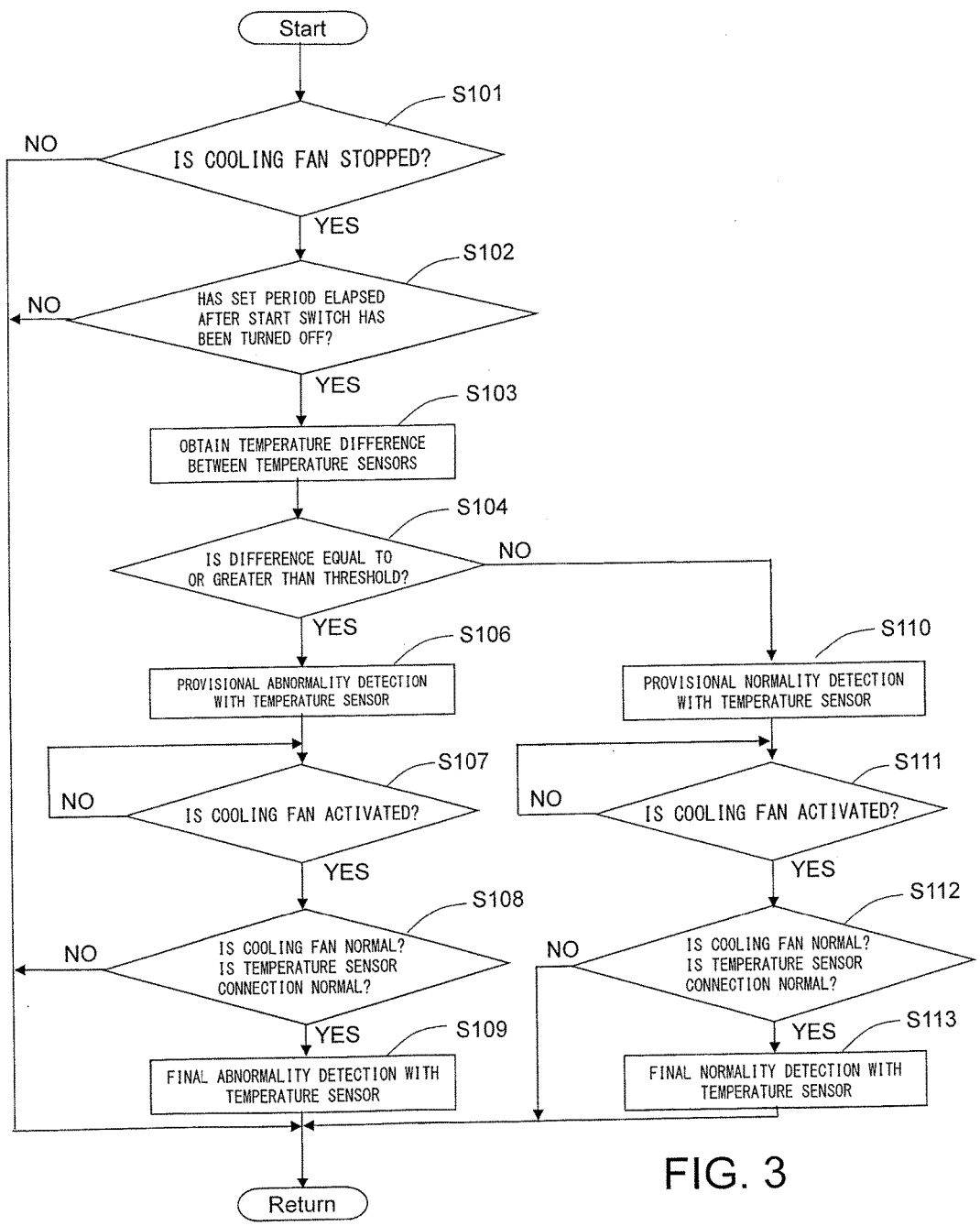
FIG. 3 is a flowchart showing another operation of a battery device according to an embodiment of the present disclosure.

When it is determined YES at step S104 in FIG. 3, the controller 40 proceeds to step S106 in FIG. 3 to detect provisional abnormality in temperature characteristic of the first or second temperature sensor 28, 38.

After detection of provisional abnormality in temperature characteristic of the first or second temperature sensor 28, 38 at step S106 in FIG. 3, the controller 40 waits until the first and second cooling fans 22, 32 start operating as indicated by step S107 in FIG. 3. The first and second cooling fans 22, 32 start operating in various cases. For example, when the start switch 50 is turned on at time t3 shown in FIG. 4B, the first and second cooling fans 22, 32 start operating at time t4 in FIG. 4B after the voltage of an auxiliary battery is stabilized.

After the first and second cooling fans 22, 32 start operating, the controller 40 proceeds to step S108 in FIG. 3 to determine whether or not the first and second cooling fans 22, 32 are operating normally and whether or not connections of the first and second respective temperature sensors 28, 38 are normal. Specifically, as the first and second cooling fans 22, 32 operate at a constant speed during the period until time t5 after its start of operation at time t4, the controller 40 obtains the differences ΔR between the instruction values with respect to the rotation speeds R1, R2 of the first and second cooling fans 22, 32 and the values detected by the first and second rotation speed sensors 27, 37 during the period between time t4 and time t5. When the respective differences ΔR are less than a predetermined threshold ΔSR, it is determined that the first and second cooling fans 22, 32 are operating normally. In addition, the controller 40 determines during the period between time t4 and time t5 whether or not the connections of the first and second temperature sensors 28, 38 are normal. Specifically, the controller 40 determines that connection of the first or second temperature sensor 28, 38 is abnormal when either one or both of the first and second temperature sensors 28, 38 is/are continually outputting zero, and normal in any other case. Note that at time t5 and thereafter, the rotation speeds R1, R2 of the first and second cooling fans 22, 32 are subjected to variable control depending on the first and second battery temperatures Tb1, Tb2 and the first and second cooling air temperatures Ta1, Ta2.

When it is determined at step S108 in FIG. 3 that the first and second cooling fans 22, 32 are normal and the connections of the first and second temperature sensors 28, 38 are normal, that is, when it is determined YES at step S108, the controller 40 proceeds to step S109 in FIG. 3 to detect final abnormality in temperature characteristic of the first or second temperature sensor 28, 38 to thereby confirm abnormality in temperature characteristic of the first or second temperature sensor 28, 38, and outputs an abnormality signal to a diagnosis unit or the like.

Meanwhile, when it is determined at step S108 in FIG. 3 that the first or second cooling fan 22, 32 is abnormal or the connection of the first or second temperature sensor 28, 38 is abnormal, that is, when it is determined NO at step S108, the controller 40 skips step S109 in FIG. 3 and ends the temperature sensor abnormality determination routine without confirming abnormality in temperature characteristic of the first or second temperature sensor 28, 38.

Further, when it is determined NO at step S104 in FIG. 3, the controller 40 proceeds to step S110 in FIG. 3 to detect provisional normality in temperature characteristic of the first or second temperature sensor 28, 38, and, similar to the above described final abnormality detection, proceeds to step S111 in FIG. 3 to wait until the first and second cooling fans 22, 32 start operating. After the first and second cooling fans 22, 32 start operating, the controller 40 proceeds to step S112 in FIG. 3 to determine whether or not the first and second cooling fans 22, 32 are normal and connections of the first and second temperature sensors 28, 38 are normal.

When it is determined at step S112 in FIG. 3, that the first and second cooling fans 22, 32 are normal and the connections of the first and second temperature sensors 28, 38 are normal, that is, when it is determined YES at step S112, the controller 40 proceeds to step S113 in FIG. 3 to detect final normality in temperature characteristic of the first or second temperature sensor 28, 38 to thereby confirm normality in temperature characteristic of the first or second temperature sensor 28, 38, and outputs a normal signal to a diagnosis unit or the like.

Meanwhile, when it is determined at step S112 in FIG. 3 that the first or second cooling fan 22, 32 is abnormal or the connection of the first or second temperature sensor 28, 38 is abnormal, that is, when it is determined NO at step S112, the controller 40 skips step S113 in FIG. 3 and ends the temperature sensor abnormality determination routine without confirming normality in temperature characteristic of the first or second temperature sensor 28, 38.

In addition to the effect of operation described above with reference to FIG. 2, the above described operation produces an effect of reducing possibility of erroneous detection of abnormality in temperature characteristic of the first or second temperature sensor 28, 38 as abnormality or normality in temperature characteristic of the first or second temperature sensor 28, 38 is confirmed after normality of the first and second cooling fans 22, 32 and normality of connections of the first and second temperature sensors 28, 38 are determined after provisional abnormality in temperature characteristic of the first or second temperature sensor 28, 38 is determined.

Note that although it is described in the above that final abnormality or normality in temperature characteristic of the first or second temperature sensor 27, 38 is detected after detection of provisional abnormality or normality in temperature characteristic of the first or second temperature sensor 28, 38 at steps S106, S110 in FIG. 3, subsequent waiting until activation of the first and second cooling fans 22, 32 at time t4 after time t3 shown in FIG. 4B at which the start switch 50 is turned on, and further subsequent determination as to whether or not the first and second cooling fans 22, 32 are normal and whether or not the connections of the first and second temperature sensors 28, 38 are normal, the timing at which to detect final abnormality or normality in temperature characteristic is not limited to that described above. For example, final abnormality or normality in temperature characteristic may be detected after detection of provisional abnormality or normality in temperature characteristic of the first or second temperature sensor 28, 38 at step S106, S110 in FIG. 3, subsequent activation of the first and second cooling fans 22, 32 due to increase of the temperature of the battery as the battery 10 is charged from an external power source with the vehicle stopped, and further subsequent determination as to whether or not the first and second cooling fans 22, 32 are normal and whether or not the connections of the first and second temperature sensors 28, 36 are normal. In this case, it is possible to confirm abnormality or normality of the first or second temperature sensors 28, 38 while the vehicle is stopped.

The invention claimed is:

1. A battery device, comprising:
   a battery for supplying electric power to a motor for driving a vehicle;
   a first cooling system having a first cooling fan for supplying cooling air to a first cooling channel of the battery and a first temperature sensor for detecting first cooling air temperature at an inlet of the first cooling channel;
   a second cooling system having a second cooling fan for supplying cooling air to a second cooling channel of the battery and a second temperature sensor for detecting second cooling air temperature at an inlet of the second cooling channel; and
   a controller for receiving a detection value from each of the first and second temperature sensors,
   wherein the controller makes abnormality determination of determining that temperature characteristic of the first or second temperature sensor is abnormal when a difference between the first cooling air temperature and the second cooling air temperature, detected by the first temperature sensor and the second temperature sensor, respectively, after elapse of a predetermined set period after a start switch of the vehicle is turned off while the first cooling fan and the second cooling fan remain stopped, is equal to or greater than a predetermined amount.

2. The battery device according to claim 1, wherein the controller confirms abnormality in the temperature characteristic of either the first temperature sensor or the second temperature sensor when it is determined that the first cooling fan and the second cooling fan are normal after the abnormality determination is made with respect to the temperature sensor.

3. The battery device according to claim 1, wherein the first temperature sensor is a first thermistor and the second temperature sensor is a second thermistor, and
   wherein the controller further determines the resistance value of the first thermistor or the resistance value of the second thermistor has changed based on the abnormality determination.

4. The battery device according to claim 1, wherein, in response to the abnormality determination, the controller outputs an abnormality signal to a diagnosis unit.

5. The battery device according to claim 1, wherein the battery is disposed in a casing,
   wherein the first temperature sensor disposed a first distance inward from a side panel of the casing,
   wherein the first temperature sensor disposed a second distance inward from the side panel of the casing, and
   wherein the first distance in not equal to the second distance.

* * * * *